US012188445B2

(12) United States Patent
Ringtved

(10) Patent No.: US 12,188,445 B2
(45) Date of Patent: Jan. 7, 2025

(54) KINETIC MACHINE, POWERED BY FLOWING WATER FOR THE EXTRACTION OF ENERGY BY PRESSURIZING WATER

(71) Applicant: Svend-Erik Ringtved, Risskov (DK)

(72) Inventor: Svend-Erik Ringtved, Risskov (DK)

( * ) Notice: Subject to any disclaimer, the term of this patent is extended or adjusted under 35 U.S.C. 154(b) by 0 days.

(21) Appl. No.: 18/286,302

(22) PCT Filed: Apr. 12, 2022

(86) PCT No.: PCT/DK2022/000079
§ 371 (c)(1),
(2) Date: Oct. 10, 2023

(87) PCT Pub. No.: WO2022/218484
PCT Pub. Date: Oct. 20, 2022

(65) Prior Publication Data

US 2024/0191684 A1 Jun. 13, 2024

(30) Foreign Application Priority Data

Apr. 14, 2021 (DK) ........................... PA 2021 00376

(51) Int. Cl.
*F03B 17/00* (2006.01)
*F03B 17/06* (2006.01)
(Continued)

(52) U.S. Cl.
CPC ........... *F03B 17/063* (2013.01); *F03B 11/004* (2013.01); *F03B 11/066* (2013.01)

(58) Field of Classification Search
CPC ...... F03B 17/063; F03B 11/02; F03B 11/004; F03B 11/066; F03B 17/061; F03B 13/264;
(Continued)

(56) References Cited

U.S. PATENT DOCUMENTS 8,338,973 B2 12/2012 Suzuki
2006/0125242 A1* 6/2006 Fraenkel ............... F03B 17/061
290/54
(Continued)

FOREIGN PATENT DOCUMENTS

| | | | |
|---|---|---|---|
| DK | 178830 | B1 | 3/2017 |
| EP | 2216543 | A1 | 8/2010 |
| WO | 2014009441 | A1 | 1/2014 |

OTHER PUBLICATIONS

International Search Report (ISR) for International Application No. PCT/DK2022/000079, completed and mailed Jun. 30, 2022, 3 pages.

(Continued)

*Primary Examiner* — Julio C. Gonzalez
(74) *Attorney, Agent, or Firm* — Ware, Fressola, Maguire & Barber LLP

(57) ABSTRACT

A kinetically driven machine for pressurizing water containing kinetically driven pressure pumps containing a front and rear part. The front part contains a pump mounted with thrust bearings, so the pump can rotate around itself. The pump is fitted with a front wing set, that can rotate the front part of the pressure pump. The rear part contains a gearbox that is mounted on the pump. The very gear is mounted on the drive shaft of the pump. A protective tube is fitted around the gearbox and attached with thrust bearings, so that the protective tube can rotate around the gearbox. The rear wing set, constructed like the front wing set, is mounted on the protective tube whereby the rear wing set can rotate the gear. The wing sets rotate in opposite directions, so the energy of the water is transformed into rotational energy that thereby drives the pump.

7 Claims, 12 Drawing Sheets

(51) Int. Cl.
*F03B 11/00* (2006.01)
*F03B 11/06* (2006.01)

(58) Field of Classification Search
CPC ............... B63B 21/50; B63B 2021/003; F05B 2260/406; F05B 2240/302; F05B 2240/30; F05B 2240/372; F05B 2240/40; F05B 2240/52; F05B 2250/311; F05B 2250/312; F05D 2210/11; E02B 9/08; Y02E 10/20; Y02E 10/30
See application file for complete search history.

(56) References Cited

U.S. PATENT DOCUMENTS

2006/0266038 A1* 11/2006 Krouse ................. F03B 17/061 60/641.7
2009/0127859 A1 5/2009 Jones et al.
2016/0333844 A1* 11/2016 Bogorodsky ........... F03B 13/08

OTHER PUBLICATIONS

Written Opinion of the International Searching Authority (ISA) for International Application No. PCT/DK2022/000079, mailed Jun. 30, 2022, 6 pages.

* cited by examiner

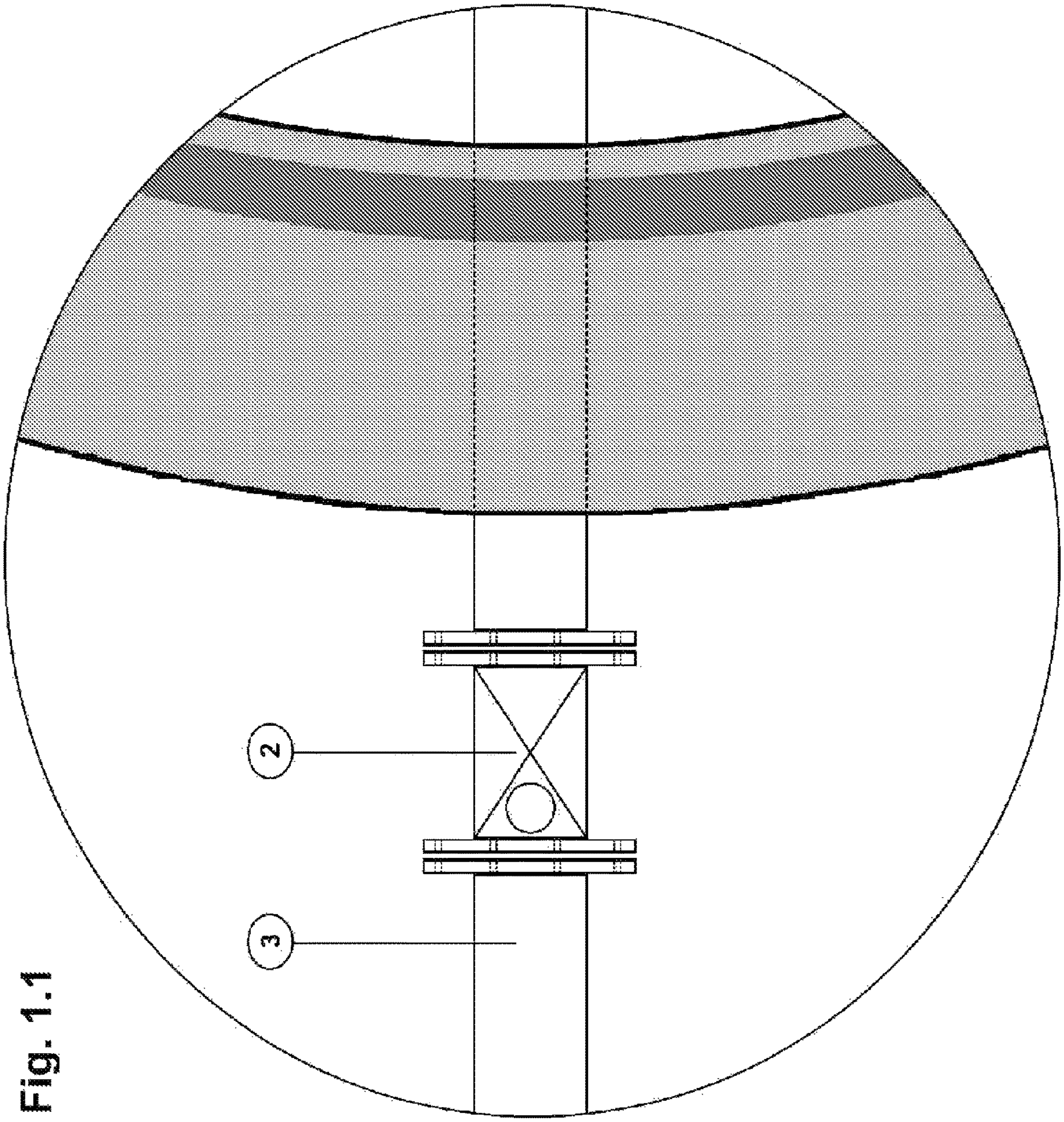
Fig. 1.1

Fig. 3.1 Circular scale-up of the front thrust bearing
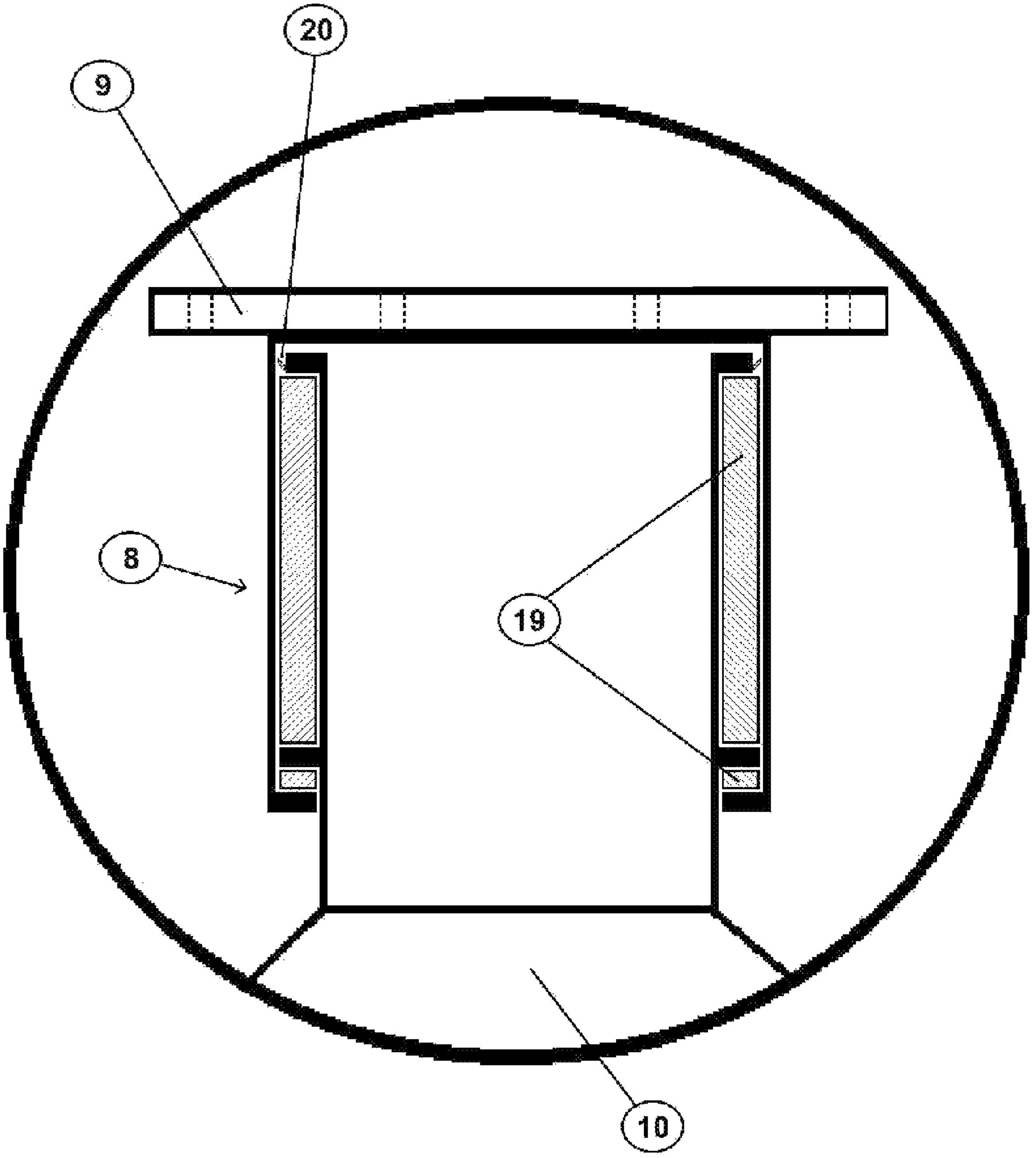

Fig. 4.1 Circular scale-up of the rear thrust bearing
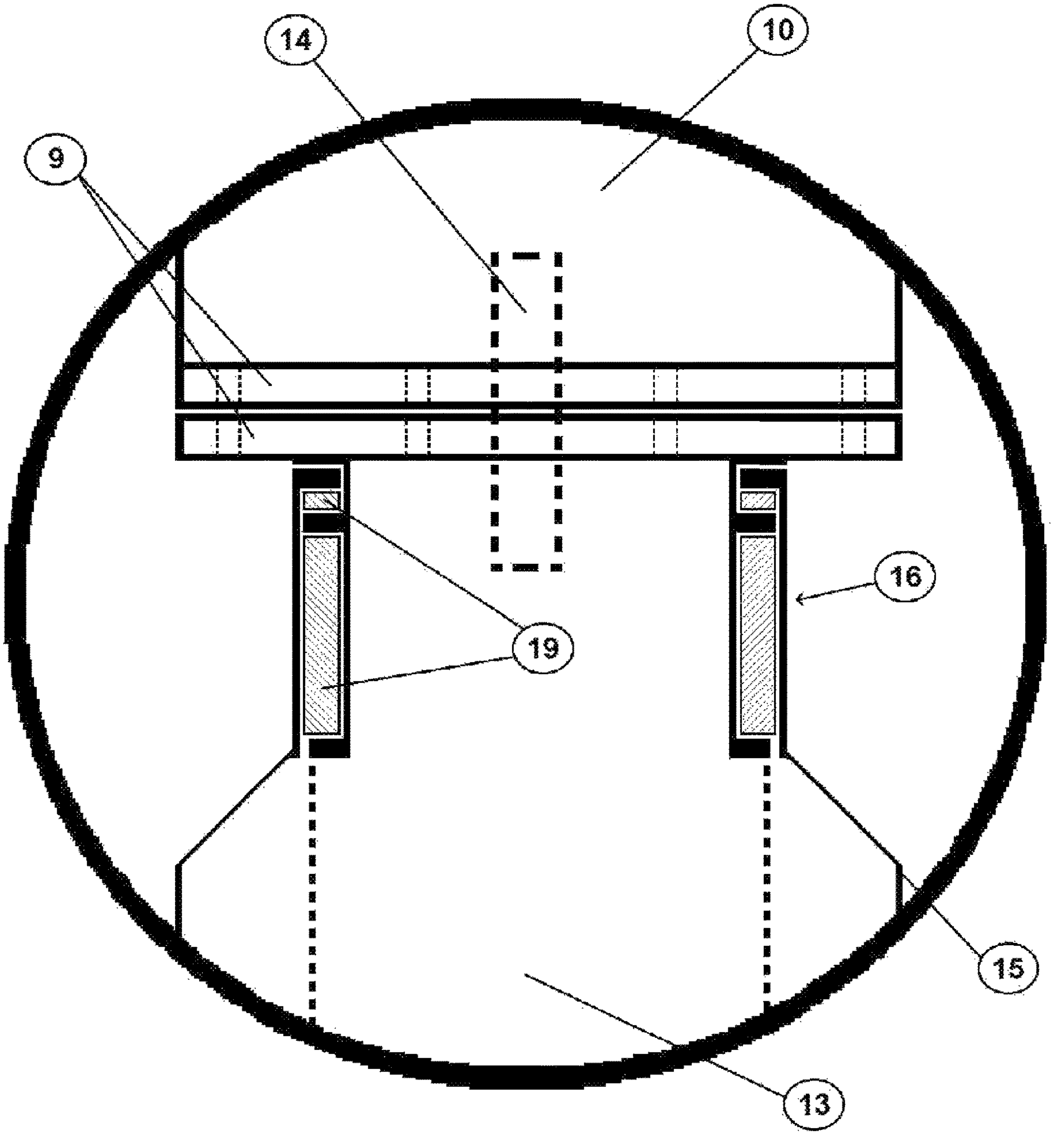

Fig. 5.1
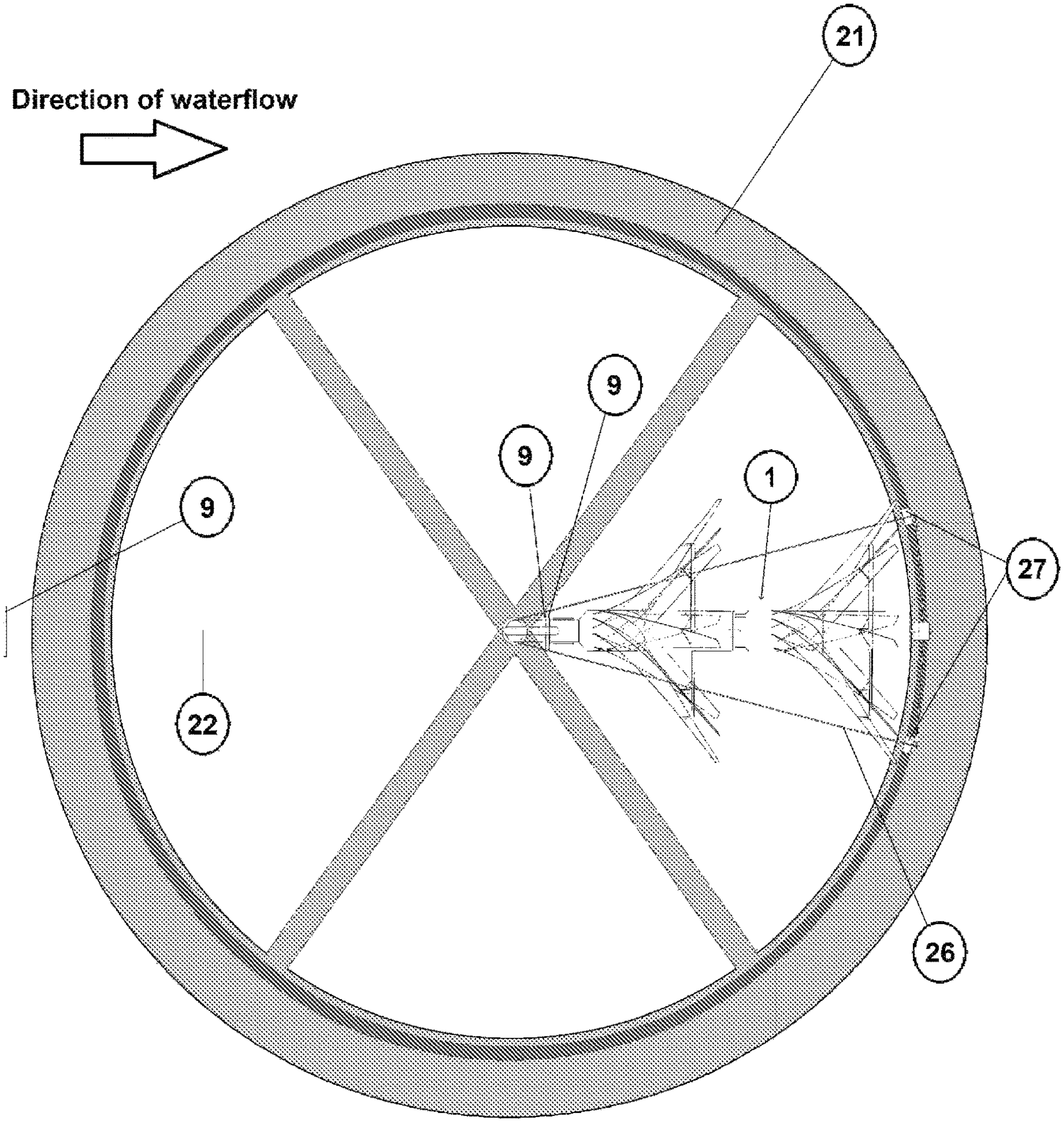

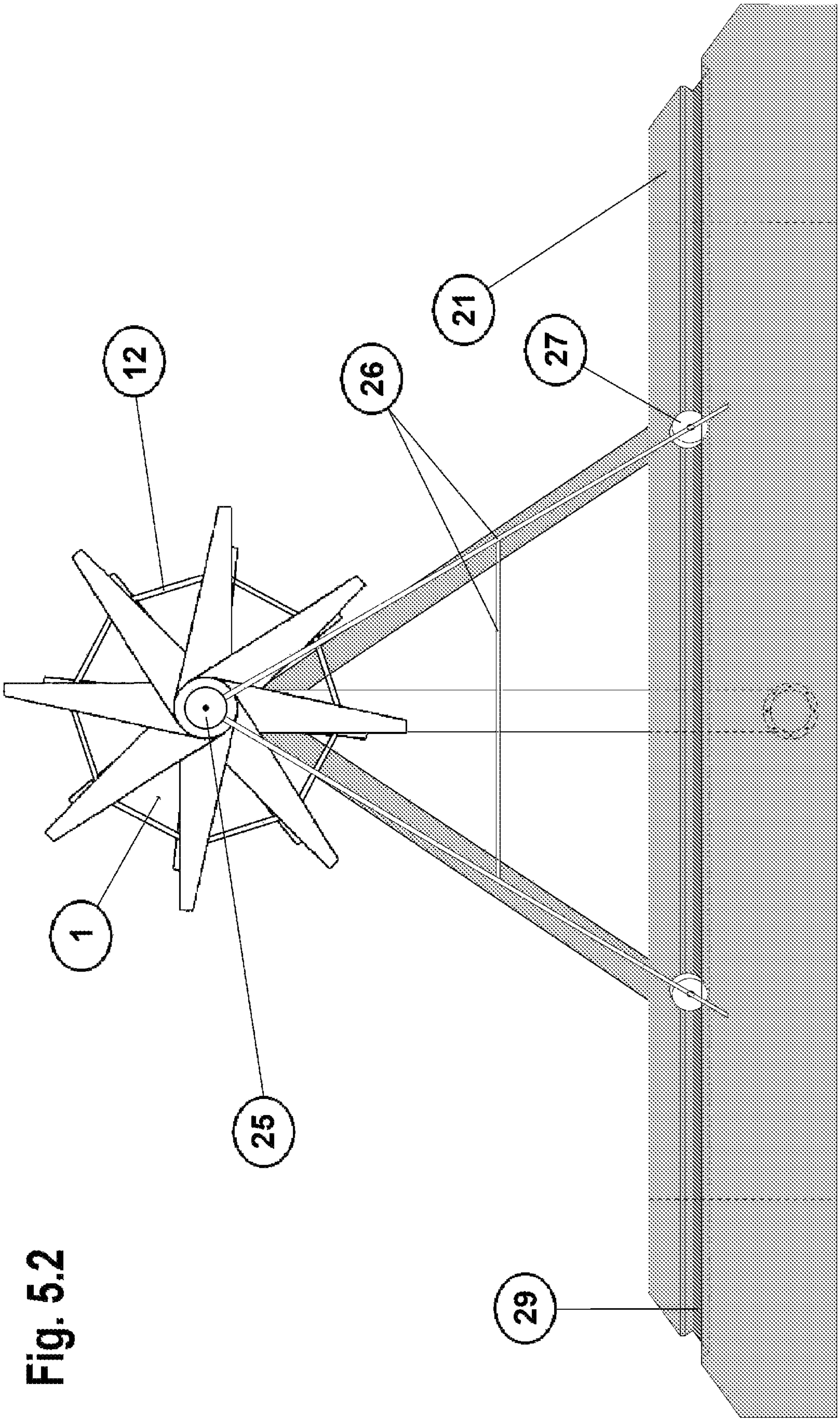
Fig. 5.2

Fig. 6.1
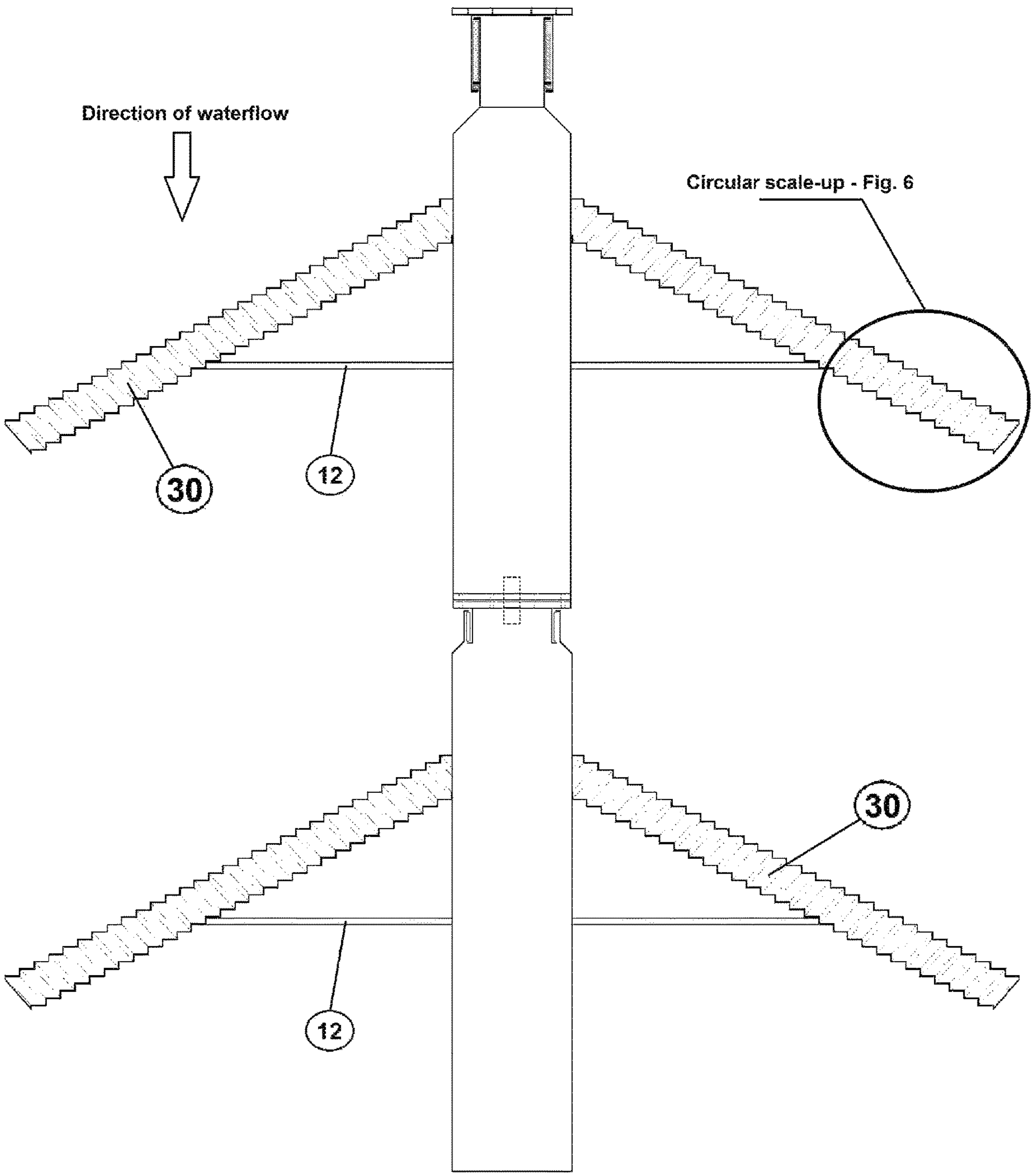

KINETIC MACHINE, POWERED BY FLOWING WATER FOR THE EXTRACTION OF ENERGY BY PRESSURIZING WATER

FIELD OF APPLICATION OF THE INVENTION

This invention is a kinetic machine, that is powered by flowing water for the extraction of energy by pressurizing water.

BACKGROUND OF THE INVENTION

To make a fast and cheap transition of the world's energy supply into a sustainable and renewable production of energy possible, this idea of a kinetic machine, that is powered by flowing water for the extraction of energy by pressurizing water, hereafter called the Invention, has been devised. Energy comes in many forms and pressurized water is potential energy. By harnessing the kinetic energy in flowing water to drive pumps for pressurizing water in pipes, the kinetic energy is transformed into potential energy. As water is essentially incompressible, the produced energy will be channelled through the pipes to the receiving station, where the potential energy can be released in a hydroelectric turbine and thus transformed into electric energy. This principle of utilizing potential energy for generation of electric energy is an already known principle from dams and EP 2216543 A1 (NOVA LAB CO. LTD. [JP]) 2010.08.11 (U.S. Pat. No. 8,338,973).

DESCRIPTION OF THE INVENTION

EP 2216543 A1 describes a kinetic machine, powered by flowing water for the extraction of energy by pressurizing water. The machine consists of the following main parts:

Kinetically driven pressure pumps, where the kinetically driven pressure pumps each contains a front part and a rear part. The front part consists of a rotating pressure pump with attached thrust bearings that allow the pressure pump to rotate freely around the longitudinal axis of the pressure pump. A wing set with several angled wings is attached to a rotating part of the pressure pump. The angled wings have a wing profile that is designed to rotate the front part of the kinetically driven pressure pump, whereby the rotational energy can drive the pressure pump to pump water.

The kinetically driven pressure pumps are each mounted on a suitable footing that stabilizes the kinetically driven pressure pump and allows the kinetically driven pressure pump to rotate freely around the footing. The kinetically driven pressure pump is coupled to a pressure pipe of the footing via a suitable coupler, the pressure pipe of the footing is coupled to a main pipe and thus connects the kinetically driven pressure pumps to the main pipe, so that the main pipe can lead the water coming from the kinetically driven pressure pumps into a receiving station. The receiving station is designed to receive the pressurized water from the main pipe and release the potential energy in the pressurised water by directing the water through hydroelectric turbines, that thereby produce electric energy.

This Invention differs from the well-known technology (EP 2216543 A1) in:

That the kinetically driven pressure pump furthermore includes a gearbox, where the gearbox has been mounted on the pressure pump, and the gear itself is connected to the drive shaft of the pressure pump via a coupling device. A protective tube is fitted around the gearbox and attached with thrust bearings, which allows the protective tube to rotate freely around the gearbox.

A rear wing set with several angled wings with a wing profile is mounted to the protective tube, and thereby the rear wing set can rotate the gear via a suitable power coupling. Wing supports are mounted between the wings in the wing sets of the kinetically driven pressure pumps. The wing supports brace the wing set and thereby the construction is able to stand the backward pressure on the wings from the flowing water. A shaft for a roller bearing is mounted on the rear end of the protective tube, where this shaft functions as the rear fixing point of the kinetically driven pressure pump.

The front wing set and rear wing set can rotate in opposite directions, so that as much as possible of the kinetic energy of the flowing water is transformed into rotational energy. The pressure pipe of the footing is connected to a valve which is mounted on a side pipe with a suitable coupling device. The side pipe is connected to the main pipe and thereby connects the kinetically driven pressure pump to the main pipe. The main pipe is equipped with a suitable footing, that is designed to be in salt water and to fix the main pipe on the seabed, under the water.

The receiving station is equipped with a bypass pipe with a valve attached to it, which connects the main pipe with a return pipe that is designed to lead the water away from the receiving station. Thereby, it is possible to bypass the hydroelectric turbines of the receiving station, by leading the pressurised water from the main pipe directly into the return pipe. The return pipe is equipped with a suitable footing, that is designed to be in salt water and to fix the return pipe.

This results in a machine that can contribute to a quick and cheap transition of the world's energy supply into a sustainable and renewable production of energy.

If you compare the Invention with the already known kinds of sustainable energy production, wind energy, solar energy and wave energy, it differs significantly from these. They all require that the wind blows, the sun shines or the waves are present, whereas the Invention has the clear advantage when installed in continuously flowing water, that it is driven by the kinetic energy in the flowing water, where the kinetically driven pressure pumps of the Invention have been installed. Thereby, it is possible to maintain a constant output from the Invention by regulation of the water pressure of the Invention through the bypass pipe.

Another essential difference from the well-known technologies is the fact that the kinetically driven pressure pumps in the Invention exclusively operate mechanically.

In a preferred embodiment, the kinetically driven pressure pumps are designed to be assembled and disassembled in main parts by use of ordinary hand tools. In this way, the kinetically driven pressure pumps can be transported in separated main parts and assembled immediately before installation, by which the kinetically driven pressure pumps take up less space during transportation.

In a preferred embodiment, the kinetically driven pressure pumps in the Invention are designed to let the surrounding water get into all the movable parts of the kinetically driven pressure pumps, so that bearings and contact surfaces are lubricated and cooled by the water. This provides the Invention with a high degree of operational reliability and a long life span.

The wings in the wing sets in the kinetically driven pressure pumps of the Invention are in an alternative embodiment designed with a wing profile, that is build up step by step by differently angled wing segments.

The total wing profile is thereby built-up step by step by straight wing segments, that are cross-mounted in accordance with the stream direction of the surrounding water, followed by wing segments that are level with the stream direction of the surrounding water respectively. With this step by step build up, the efficiency from a cross-mounted wing segment is combined with the strength of a wing segment, that has been angled backwards and thereby can get wing supports mounted. Hereby, the degree of utilization of the kinetic energy in the flowing water will increase.

In a preferred embodiment, wing supports are mounted between the wings in the wing sets of the kinetically driven pressure pumps. Hereby, the wings of the wing set are connected to each other, which braces the wing set.

In a preferred embodiment, the kinetically driven pressure pumps and valves are made from a salt water resistant material. By salt water resistant material is meant e.g. stainless steel or aluminium bronze. With these materials, corrosion will be counteracted, and the life span of the mechanical assemblies made according to the Invention will be prolonged.

In a preferred embodiment, the footing for the kinetically driven pressure pumps is made from a salt water resistant material. By salt water resistant material is meant e.g. stainless steel or concrete. With these materials, corrosion will be counteracted, and the life span of the footing will be prolonged.

In a preferred embodiment, the kinetically driven pressure pumps of the Invention are mounted under a pontoon mooring system, whereby the kinetically driven pressure pumps are fixable at various water depths. Hereby, the kinetically driven pressure pumps of the Invention exploit the stream of the water, where it is most powerful, and the kinetically driven pressure pumps will align themselves according to the direction of the water stream.

In a preferred embodiment, each side pipe of the Invention has been fitted with a valve, so that the side pipe and the main pipe can be kept pressurized, even if one or more of the kinetically driven pressure pumps are disconnected.

In a preferred embodiment, the main pipe is composed of several pipe sections. These pipe sections have different diameters and are assembled so that the main pipe has the largest diameter at the receiving station and the smallest diameter in the opposite end, where the main pipe is closed off. Hereby, the pipe sections can be pushed into each other and take up less space during transportation.

In a preferred embodiment, the side pipes, the main pipe and the return pipe are made from a salt water resistant material. By salt water resistant material is meant e.g. technical plastics or composite material. By using these materials, corrosion will be counteracted, and the life span of the pipes will be prolonged.

In a preferred embodiment, the footing for the main pipe and the footing for the return pipe are made from a salt water resistant material. By salt water resistant material is meant e.g. stainless steel or concrete. By using these materials, corrosion will be counteracted, and the life span of the footing will be prolonged.

In a preferred embodiment, the Invention contains more main pipes or more return pipes, whereby the capacity of the receiving station will be increased.

In a preferred embodiment, the Invention is additionally designed to utilize the pressurised water from the main pipe to produce drinking water through reverse osmosis. Thereby, the Invention can produce clean drinking water, as well as energy.

BRIEF DESCRIPTION OF THE DRAWINGS

FIG. 1.1 is a circular scaled-up drawing of the part indicated in FIG. 1;

FIG. 3.1 is a circular scaled-up drawing of the part indicated in FIG. 3;

FIG. 4.1 is a circular scaled-up drawing of the part circled in FIG. 4 and shows how the rear thrust bearing in a kinetically driven pressure pump is constructed;

FIG. 5.1 shows the design of the footing for the kinetically driven pressure pumps seen from above;

FIG. 5.2 shows the kinetically driven pressure pump on the footing, as seen from behind;

FIG. 6.1 shows where the section in FIG. 6 originates from.

DETAILED DESCRIPTION OF EMBODIMENTS

Figure 1:
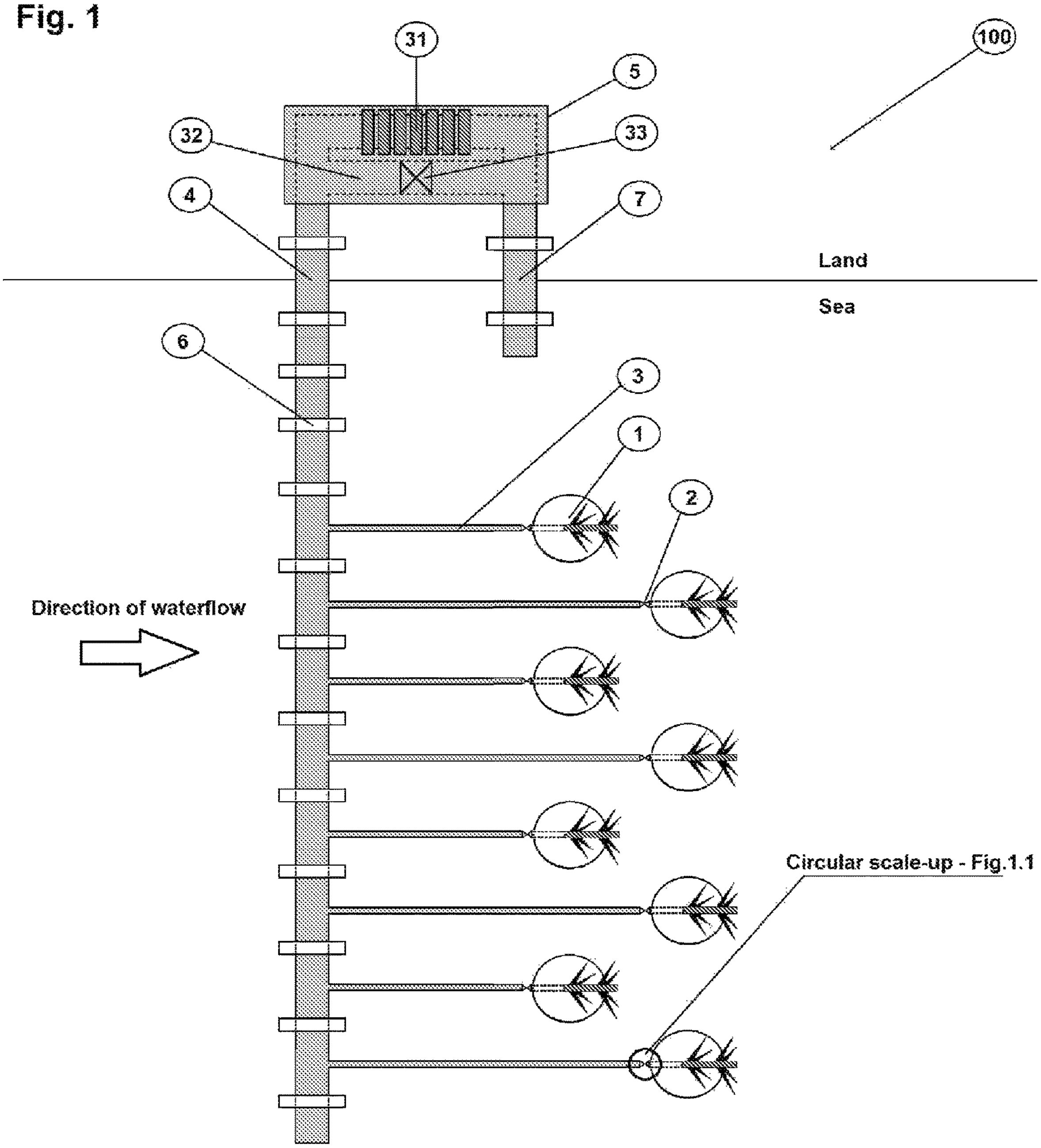
FIG. 1 shows the construction of the invention as well as a circled part enlarged in FIG. 1.1.

In FIG. 1, the basic ingredients of an invention that combines the essential factors of a cheap, reliable, and effective kinetic machine, driven by flowing water for energy utilization via pressurising water, is shown. The basic principles of the Invention are to supply a main pipe with pressurised water via several side pipes. In the opposite end, these side pipes are connected with separate valves, whereafter a kinetically driven pressure pump is mounted. The main pipe directs the pressurised water from the side pipes to a receiving station, where the (potential) energy can be released.

Thus, FIG. 1 shows the construction of the Invention. The Invention is constructed from several different main parts, that are all connected. Kinetically driven pressure pumps (1) have each been fitted with a valve (2), which is connected to a side pipe (3) with a suitable coupling device. These side pipes (3) are all connected to a main pipe (4), that directs the pressurised water from the side pipes (3) into a receiving station (5). The main pipe itself (4) goes from the receiving station (5) into the water, where it is closed off in the opposite end. Throughout the entire length of the main pipe (4) an appropriate number of footings (6) has been installed. The footings are made from a salt water resistant material. The receiving station (5) is where the potential energy in the pressurised water can be released by use of hydroelectric turbines (31) for production of electric energy. The 225 receiving station (5) has been equipped with a bypass pipe (32) and a return pipe (7), through which the water can be directed out of the receiving station (5) again.

FIG. 1.1 is a circular scaled-up drawing of the circled part in the lower part of FIG. 1 at the juncture of the side pipe (3) and the kinetically driven pressure pump (1) that shows how a valve (2) has been attached to the end of each side pipe (3), so that the main pipe (4) can be kept under pressure even if one or more kinetically driven pressure pumps (1) are disconnected. This makes it possible to connect or disconnect kinetically driven pressure pumps (1) without having to stop operation of an apparatus constructed according to the Invention.

Figure 2:
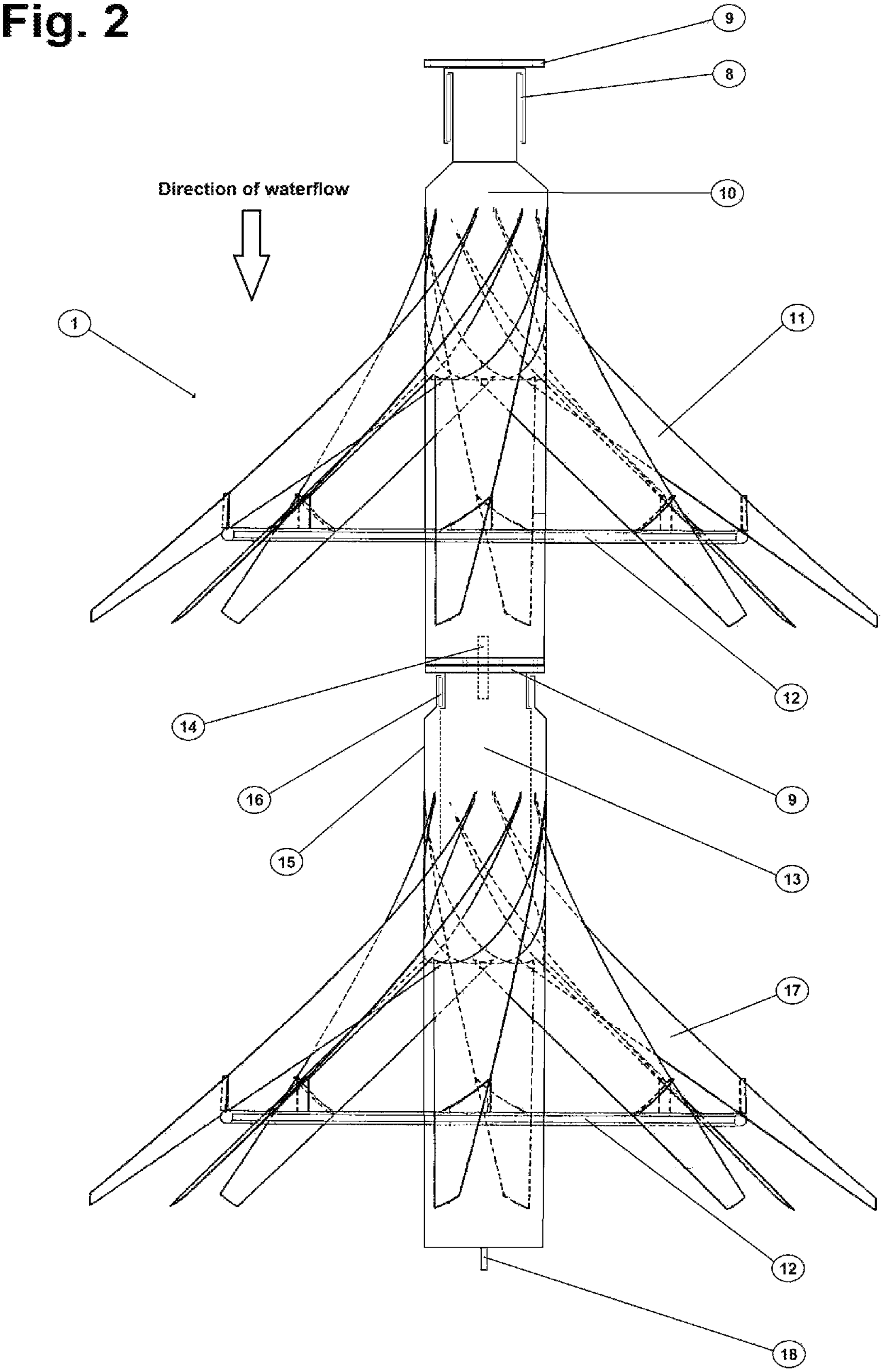
FIG. 2 shows how a kinetically driven pressure pump can be constructed by the assembly of main parts.

FIG. 2 shows how a kinetically driven pressure pump (1) can be constructed by the assembly of main parts. At the front, there is a thrust bearing (8) with a suitable coupling device (9). The thrust bearing (8) is attached to the pressure side (10) of a suitable pressure pump (1) and thus allows the pressure pump (1) to rotate freely. A front wing set (11), which contains several wings, has been attached to the pressure pump (1) by use of an appropriate fixing device. The wings in the wing set (11) are angled so that as much kinetic energy as possible in the flowing water is transformed into rotational energy. The wings in the wing set (11) have been angled backwards, so that a wing support (12) can be attached between the wings. The wing support (12) braces the wing set (11), so that it is able to stand the pressure from the flowing water.

At the suction side of the pressure pump (10), a gearbox (13) is attached which is connected to a drive shaft (14) of the pressure pump (10) with a suitable coupling device. A protective tube (15) (fitted) with a thrust bearing (16) has been mounted around the gearbox, so that the protective tube (15) can rotate freely around the gearbox (13). A rear wing set (17), which contains several angled wings, is mounted on the protective tube (15), and thus the rear wing set (17) can rotate the gear via a suitable coupling device.

The wings in the rear wing set (17) are angled so that as much of the kinetic energy in the flowing water as possible is transformed into rotational energy. The wings in the rear wing set (17) have been angled backwards, so that the wing support (12) can be attached between the wings. The wing support (12) braces the rear wing set (17), so it is able to stand the pressure from the flowing water.

A shaft for a rear roller bearing (18) is placed at a rear end of the protective tube (15). This shaft for the rear roller bearing (18) functions as a rear fixing point for the kinetically driven pressure pump (1).

Thereby, the front wing set (11) can drive the pressure side (10) of the pressure pump (1) and the gearbox (13) in one rotational direction, while the rear wing set (17) can drive the drive shaft of the gearbox (13) in the opposite rotational direction. The shaft for the rear roller bearing (18) is mounted on the rear end of the protective tube (15). Together with the front thrust bearing (8), this rear roller bearing (18) make up the fixing points of the kinetically driven pressure pump (1), so that it can be kept horizontal in the flowing water.

Figure 3:
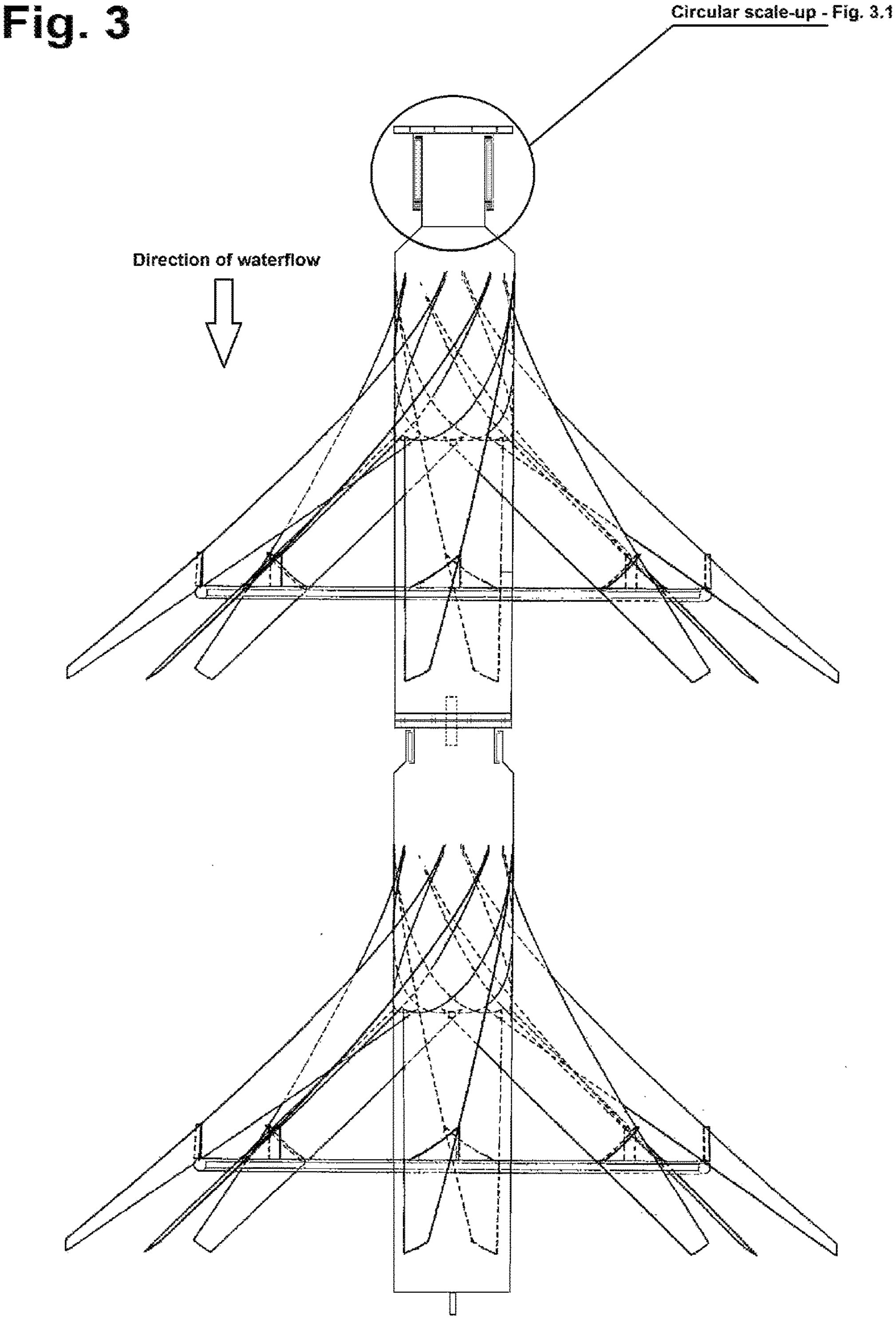
FIG. 3 is similar to FIG. 2 except without reference numerals and also showing a circled part enlarged in FIG. 3.1.

The drawing in FIG. 3 is similar to FIG. 2 but without reference numerals and shows where the circular scaled-up drawing in FIG. 3.1 is from.

The circular scaled-up drawing in FIG. 3.1 displays how the front thrust bearing (8) in the kinetically driven pressure pump (1) is constructed. At the front end, there is a suitable coupling device (9), on which the thrust bearing (8) is mounted. The thrust bearing (8) is constructed from rollers (19) and a lip gasket. The thrust bearing allows the pressure pump (10) to rotate freely together with the mounted front wing set (11).

Figure 4:
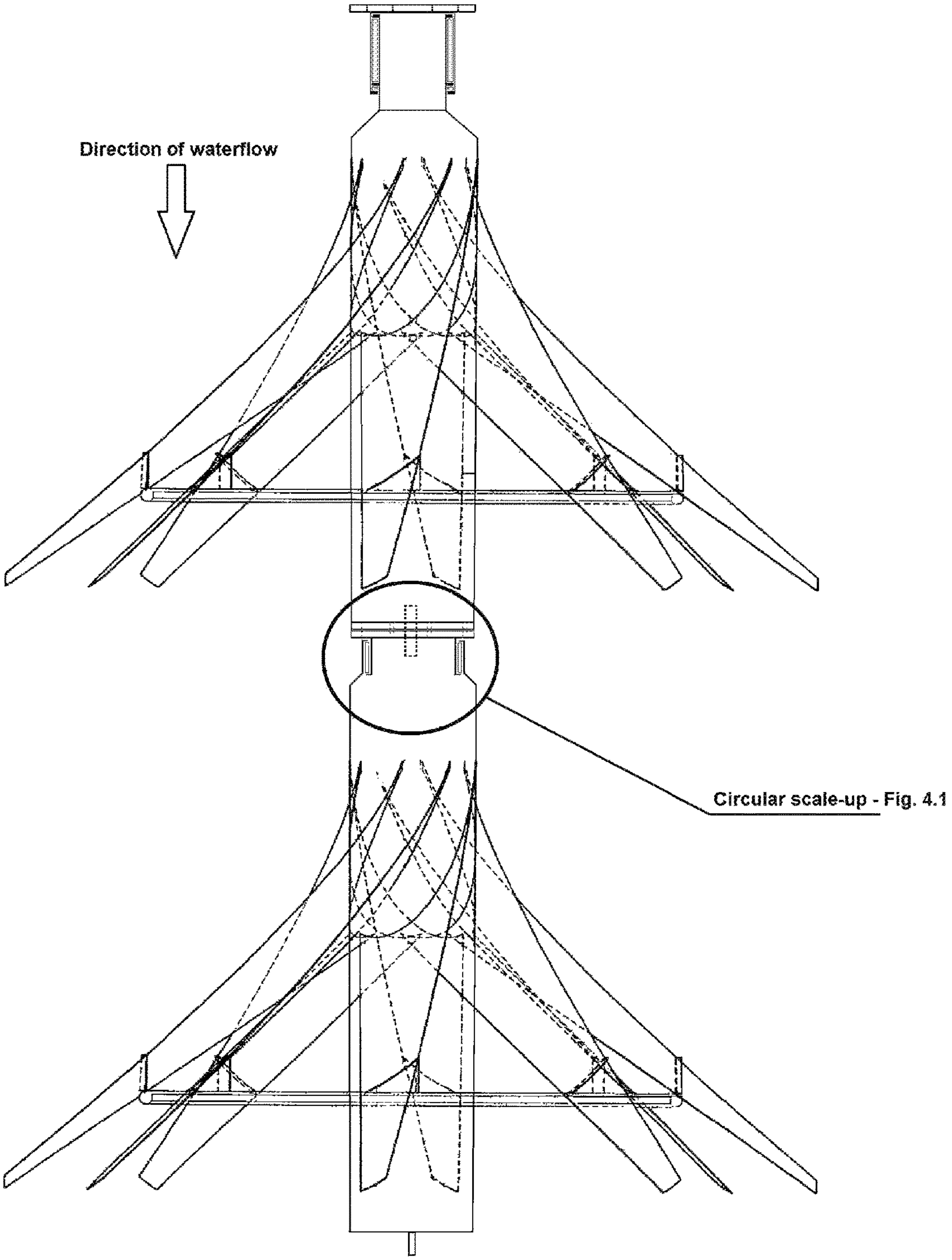
FIG. 4 is similar to FIG. 2 except without reference numerals and also shows a circled part enlarged in FIG. 3.1.

The drawing in FIG. 4 is similar to FIG. 2 but without reference numerals and shows where the circular scaled-up drawing in FIG. 4.1 is from.

The circular scaled-up drawing in FIG. 4.1 displays how the rear thrust bearing (16) in a kinetically driven pressure pump (1) is constructed. At the suction side of the pressure pump (10) a suitable coupling device (9) has been mounted. This has been connected to a similar coupling device (9) that has been mounted on a suitable gearbox (13) connected to the drive shaft (14) of the pressure pump (10) with a suitable coupling device. The protective tube (15) has been mounted on the gearbox (13) with a thrust bearing (16), that has been constructed from rollers (19). Thereby, the protective tube (15) can rotate freely around the gearbox (13) and drive the drive shaft of the gearbox (13) together with the mounted rear wing set (17). Thereby, the front wing set (11) can drive the pressure pump (10) and the gearbox (13) rotationally one way around, while the rear wing set (17) can drive the drive shaft of the gear the opposite rotational way around.

Figure 5:
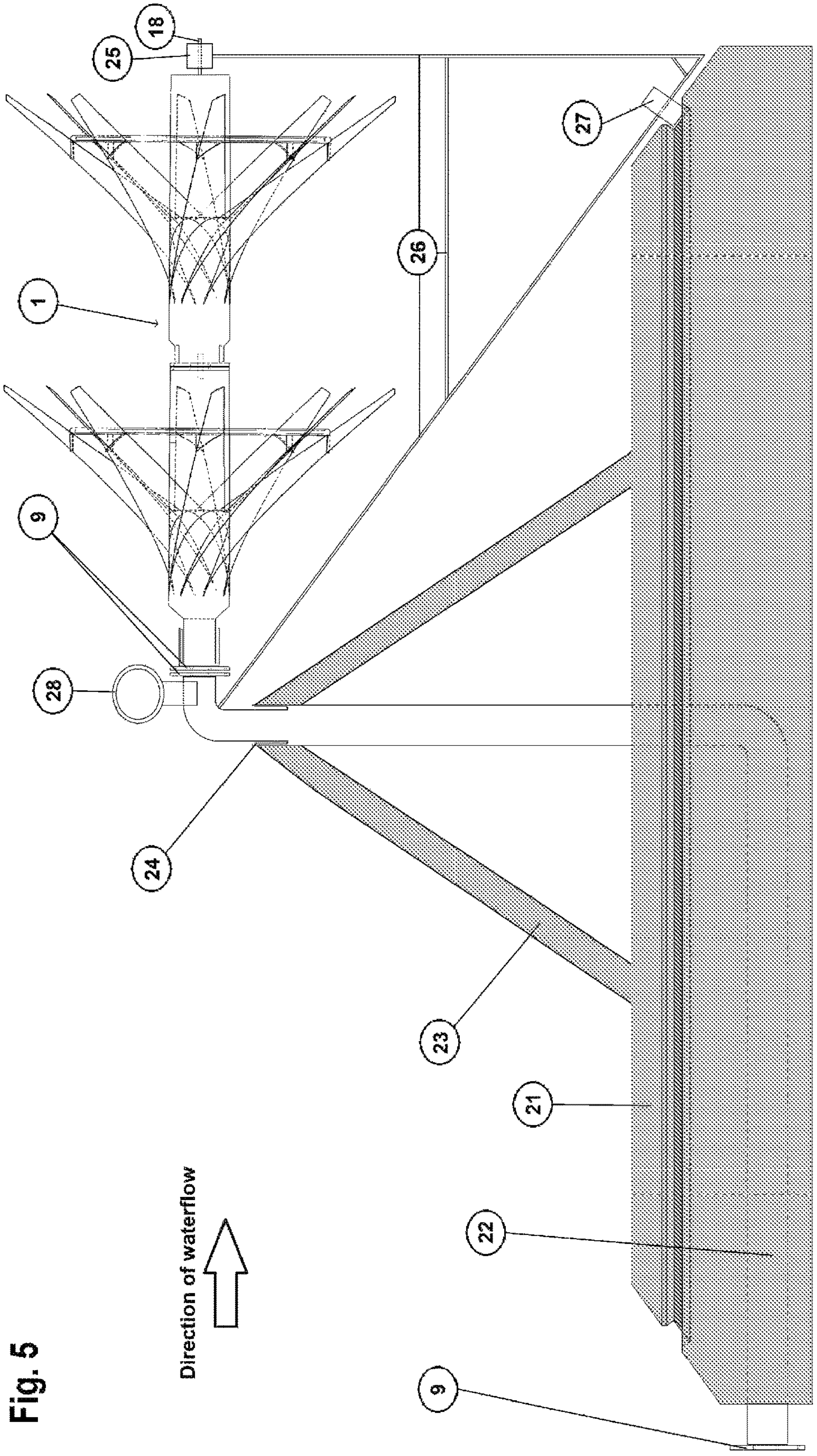
FIG. 5 illustrates how a kinetically driven pressure pump looks in a side-view.

The drawing in FIG. 5 illustrates how a kinetically driven pressure pump (1) looks in a side-view. The kinetically driven pressure pump (1) can be mounted on a suitable footing (21) made from a salt water resistant material. This footing for kinetically driven pressure pumps (21) has several functions that increases the efficiency of constructions made according to the Invention. One of the functions is to act as an anchoring platform for the kinetically driven pressure pump (1), that can rotate freely around the footing (21) as illustrated in FIG. 5.1. Furthermore, the footing (21) has been equipped with a pressure pipe (22) that functions as a link between the coupling device (9) of the kinetically driven pressure pump (1) and the valve (2) that is mounted on the end of the side pipe (3). This functions as suitable coupling devices (9) that are mounted, as shown on the drawing.

Furthermore, the footing (21) has been equipped with support beams (23) that are made from a salt water resistant material. These support beams (23) function to fix a roller bearing (24) of the footing (21), which makes it possible for the kinetically driven pressure pump (1) to rotate freely around the footing (21). The shaft for the rear roller bearing (18) is mounted on the rear end of the kinetically driven pressure pump (1) as described in FIG. 2. A roller bearing (25) has been mounted on this shaft for the rear roller bearing (18), so that the kinetically driven pressure pump (1) can rotate freely in the water. The roller bearing (25) has been mounted on a supportive tube structure (26) of a suitable size that ensures that the kinetically driven pressure pump can be kept horizontal. The supportive tube structure (26) has been equipped with 335 supporting wheels (27) that assist the kinetically driven pressure pump (1) in rotating freely around the footing (21). A hoisting ring (28) has been mounted at the top of the footing (21), which makes it possible to lift the footing (21) and the kinetically driven pressure pump (1) out of the water.

FIG. 5.1 shows the design of the footing (21) for the kinetically driven pressure pumps (1) seen from above. By use of a round footing (21) as shown on the drawing, the kinetically driven pressure pump (1) can rotate freely around the footing (21), which makes it possible to utilize the flowing water from shifting directions to power the kinetically driven pressure pump (1) and thereby the Invention. The kinetically driven pressure pump (1) is mounted on the footing (21) and equipped with a supportive tube structure (26), on which wheels (27) are mounted. The drawing displays how the footing (21) contains a pressure pipe (22) with mounted coupling devices (9), so that the kinetically driven pressure pump (1) can be connected to the footing (21). In the opposite end, a suitable coupling device (9) has been mounted on the pressure pipe (22) of the footing (21). The coupling device (9) is connected to the valve (2), that has been mounted at the rear end of the side pipe (3).

FIG. 5.2 shows a kinetically driven pressure pump (1) on a footing (21), seen in a direction opposite to the flow of water in FIG. 2, i.e., from behind the pump. The drawing displays how the wing supports (12) have been mounted between the wings. The supporting tube structure (26) functions as a fixation for the rear roller bearing and allows the kinetically driven pressure pump (1) to be kept horizontal. The footing (21) has a track (29) for the supporting wheels (2), in which the supporting wheels (27) can ride.

Figure 6:
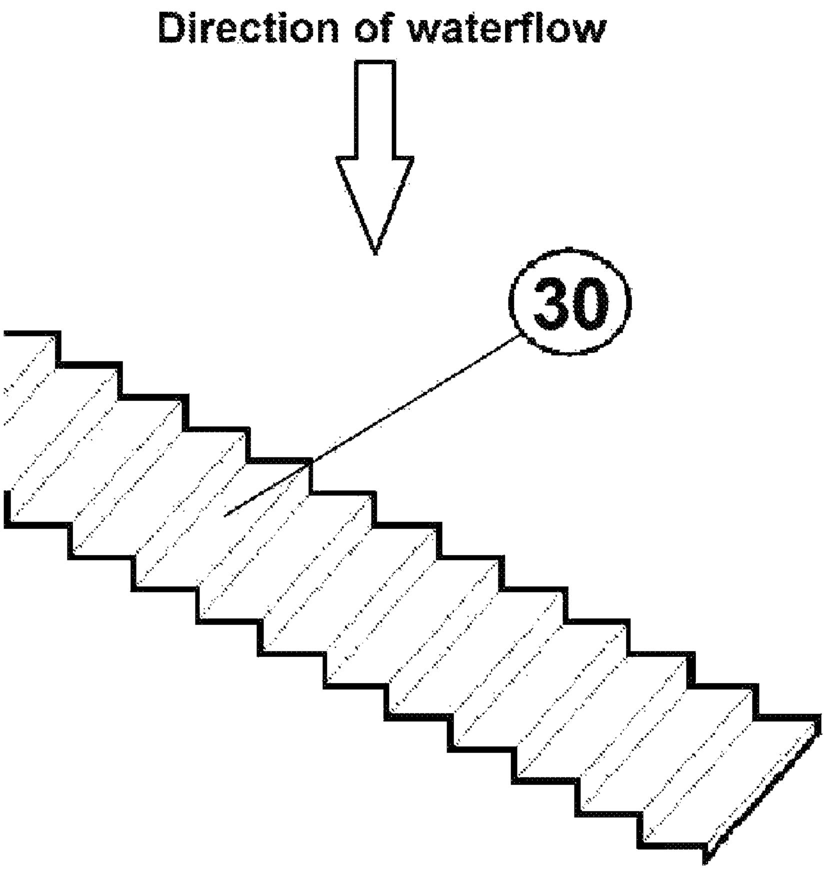
FIG. 6 shows a section of a wing.

A section of a wing is shown in FIG. 6. The drawing displays a wing profile (30) build up step by step by differently angled wing segments, where the efficiency of a straight wing can be combined with the strength of an angled wing.

FIG. 6.1 shows where the section in FIG. 6 originates from. FIG. 6.1 also shows, how the front and rear wing sets (11, 17) of the kinetically driven pressure pumps (1) can be designed with a wing profile build up step by step by differently angled wing segments (30) (as shown in FIG. 6). The collective wing profile can be built up step by step from straight wing segments, that are cross-mounted in relation to the flowing direction of the water, followed by wing segments that align with the flowing direction of the water. With this step by step build up, the efficiency of a cross-mounted wing segment can be combined with the strength of a wing segment, that has been angled backwards and mounted on wing supports (12).

REFERENCE TO DRAWINGS (1) Kinetically driven pressure pump
(2) Valve
(3) Side pipe
(4) Main pipe
(5) Receiving station
(6) Pipe footing
(7) Return pipe
(8) Front thrust bearing
(9) Coupling device
(10) Pressure pump
(11) Front wing set
(12) Wing supports
(13) Gearbox
(14) Drive shaft of the pressure pump
(15) Protective tube
(16) Rear thrust bearing
(17) Rear wing set
(18) Shaft for the rear roller bearing
(19) Rollers
(20) Lip gasket
(21) Footing for the kinetically driven pressure pump
(22) Pressure pipe
(23) Support beams for the footing for the kinetically driven pressure pump
(24) Roller bearing for the footing for the kinetically driven pressure pump
(25) Rear roller bearing
(26) Supporting tube structure
(27) Supporting wheel
(28) Hoisting ring
(29) Track for the supporting wheels
(30) Wing profile built up step by step by differently angled wing segments
(31) Hydroelectric turbines
(32) Bypass pipe
(33) Valve
(100) Kinetic machine, powered by flowing water for the extraction of energy by pressurising water

The invention claimed is:

1. A kinetic machine (100), powered by flowing water for the extraction of energy by pressurizing water, where the machine comprises: kinetically driven pressure pumps (1), where the kinetically driven pressure pumps (1) each comprises a front part and a rear part, wherein the front part contains a rotating pressure pump (10) which is attached with thrust bearings (8) that allow the pressure pump (10) to rotate freely around a longitudinal axis of the pressure pump (10); a front wing set (11) with several angled wings attached to the pressure pump (10), where the angled wings have a wing profile that is configured to rotate the front part of the kinetically driven pressure pump (1), whereby rotational energy drives the pressure pump (1) to pump water; wherein the kinetically driven pressure pumps (1) are each mounted on a footing (21) that stabilizes the kinetically driven pressure pump (1) and allows the kinetically driven pressure pump (1) to rotate freely around the footing (21); wherein each kinetically driven pressure pump (1) is coupled to a pressure pipe (22) of the footing (21) via a coupler and the pressure pipe (22) of the footing (21) is connected to a main pipe (4) and thus connects each kinetically driven pressure pump (1) to the main pipe (4), so that the main pipe (4) leads water coming from the kinetically driven pressure pumps (1) into a receiving station (5); wherein the receiving station (5) is configured to receive pressurized water from the main pipe (4) and release potential energy in the pressurized water by directing the pressurized water through hydroelectric turbines (31) that thereby produce electric energy, wherein each kinetically driven pressure pump (1) furthermore includes a gearbox (13), where the gearbox (13) is mounted on the pressure pump (10) and a gear of the gearbox is connected to a drive shaft (14) of the pressure pump (10) via a coupling device; wherein a protective tube (15) is fitted around the gearbox (13) and attached with thrust bearings (16) that allow the protective tube (15) to rotate freely around the gearbox (13), and that a rear wing set (17) containing several angled wings with a wing profile is mounted on the protective tube (15) and thereby the gear is rotatable by the rear wing set (17) via a gear coupling device; wherein wing supports (12) are mounted between the wings in the wing sets (11, 17) of each kinetically driven pressure pump (1); wherein a shaft for a roller bearing (18) is mounted on the rear end of the protective tube (15) to function as a rear fixing point of the kinetically driven pressure pump; wherein the front wing set (11) and the rear wing set (17) are rotatable in opposite directions, so that as much as possible of the kinetic energy of the flowing water is transformed into rotational energy; wherein the pressure pipe (22) of the footing (21) is attached to a valve (2) that is mounted on a side pipe (3) with a coupler (9), wherein the side pipe (3) is connected to the main pipe (4) and thereby connects the kinetically driven pressure pump (1) to the main pipe (4); wherein the main pipe (4) is equipped with footing (6) configured for use in salt water and to fix the main pipe (4) on an underwater sea bed; wherein the receiving station (5) is equipped with a bypass pipe (32) with an attached valve (33) that connects the main pipe (4) with a return pipe (7) that is able to lead pressurized water away from the receiving station (5), wherein the return pipe (7) is equipped with a return pipe footing (6) configured for use in salt water and to fix the return pipe (7).

2. The kinetic machine of claim 1, wherein the kinetically driven pressure pumps (1) exclusively operate mechanically.

3. The kinetic machine of claim 1, wherein the kinetically driven pressure pumps (1) are configured to let surrounding water get into all movable parts of the kinetically driven pressure pumps (1), so that bearings and contact surfaces are lubricated and cooled by water.

4. The kinetic machine of claim 1, wherein wing supports (12) are mounted between the wings in each of the front wing set and rear wing set of the kinetically driven pressure pumps.

5. The kinetic machine of claim 1, wherein the kinetically driven pressure pumps (1) are mounted under a pontoon mooring system, whereby the kinetically driven pressure pumps are fixable at various water depths.

6. The kinetic machine of claim 1, wherein each side pipe (3) is fitted with a valve (2), so that the side pipes (3) and the main pipe (4) remain pressurized, even if one or more of the kinetically driven pressure pumps are disconnected.

7. The kinetic machine of claim 1, configured to utilize the pressurized water from the main pipe (4) to produce drinking water through reverse osmosis.

* * * * *